(12) United States Patent
Lacy

(10) Patent No.: US 12,553,459 B2
(45) Date of Patent: Feb. 17, 2026

(54) JUNCTION ASSEMBLY FOR ACCESSORY ATTACHMENT TO VARIABLE TEMPORARY STRUCTURES

(71) Applicant: Bijou Corp., Camden, ME (US)

(72) Inventor: Amanda Lacy, Camden, ME (US)

(73) Assignee: Bijou Corp., Camden, ME (US)

( * ) Notice: Subject to any disclaimer, the term of this patent is extended or adjusted under 35 U.S.C. 154(b) by 0 days.

(21) Appl. No.: 18/783,195

(22) Filed: Jul. 24, 2024

(65) Prior Publication Data

US 2026/0029009 A1    Jan. 29, 2026

(51) Int. Cl.
*F16B 7/18* (2006.01)

(52) U.S. Cl.
CPC .................... *F16B 7/185* (2013.01)

(58) Field of Classification Search
CPC ..... E04G 25/00; E04G 2025/006; E04C 3/36; E04H 12/187; E04H 12/04; E04H 12/30; E04B 1/2608; F16M 11/38
USPC .................................................. 403/61, 119
See application file for complete search history.

(56) References Cited

U.S. PATENT DOCUMENTS

| | | | | |
|---|---|---|---|---|
| 2,629,906 A | * | 2/1953 | Holmes | E04B 1/2604 403/187 |
| 3,978,943 A | * | 9/1976 | Greenman | B25H 1/06 182/186.3 |
| 4,238,001 A | * | 12/1980 | Alexander | B25H 1/06 182/186.3 |
| 4,325,463 A | * | 4/1982 | Taylor | B25H 1/06 182/155 |
| 4,461,370 A | * | 7/1984 | Connell | B25H 1/06 182/186.3 |
| 5,377,780 A | * | 1/1995 | Dunaway | B25H 1/06 182/186.3 |
| 5,779,003 A | * | 7/1998 | Carty | E04G 1/34 182/155 |
| 5,913,381 A | * | 6/1999 | D'Armond, Jr. | E04G 1/32 182/186.3 |
| 6,612,401 B1 | * | 9/2003 | Price | B25H 1/06 182/186.3 |
| 6,810,996 B2 | * | 11/2004 | Rump | B25H 1/06 182/153 |
| 7,017,876 B1 | * | 3/2006 | LeCher | A63G 9/00 182/151 |
| 7,235,019 B1 | * | 6/2007 | LeCher | A63G 9/00 403/217 |

(Continued)

FOREIGN PATENT DOCUMENTS

WO    2008119126 A1    10/2008

OTHER PUBLICATIONS

International Search Report and Written Opinion of the International Searching Authority in relation to International Application No. PCT/US2024/039390, dated Oct. 18, 2024, 8 pages.

*Primary Examiner* — Paola Agudelo
(74) *Attorney, Agent, or Firm* — Taylor Dykema PLLC; Eric Kleinertz

(57) ABSTRACT

A junction assembly comprising a primary hub, the primary hub comprising one or more primary hub sidewalls, one or more primary hub angular members; a top member disposed atop the primary hub; a secondary hub disposed below the primary hub; and one or more brackets pivotably coupled to at least one of the primary hub and the secondary hub.

17 Claims, 14 Drawing Sheets

(56) References Cited

U.S. PATENT DOCUMENTS

| | | | | |
|---|---|---|---|---|
| 8,807,498 | B1* | 8/2014 | McCoy | B27B 21/00 |
| | | | | 248/228.1 |
| 8,959,857 | B1* | 2/2015 | Lin | E04H 12/2261 |
| | | | | 52/297 |
| 10,227,772 | B1* | 3/2019 | Hill | E04C 3/00 |
| 10,358,811 | B1* | 7/2019 | Fox | E04B 1/2604 |
| 11,149,431 | B1* | 10/2021 | Meznarich | E04B 7/022 |
| 11,614,309 | B2* | 3/2023 | Zhao | F41J 1/10 |
| | | | | 273/407 |
| 11,814,855 | B2* | 11/2023 | Coates, Jr. | E04H 12/04 |
| 2006/0135273 | A1* | 6/2006 | Zeilinger | A63G 9/12 |
| | | | | 472/118 |
| 2022/0003011 | A1* | 1/2022 | Coates, Jr. | E04H 12/30 |
| 2024/0058942 | A1* | 2/2024 | Hanlon | B25H 1/06 |

\* cited by examiner

JUNCTION ASSEMBLY FOR ACCESSORY ATTACHMENT TO VARIABLE TEMPORARY STRUCTURES

FIELD OF THE INVENTION

The present disclosure is directed to a junction assembly. More specifically, the present disclosure is directed to a junction assembly for accessory attachment to variable temporary structures.

INTRODUCTION

Existing children's play structures are commonly marketed as "one size fits all," which implies such a play structure has a fixed size and orientation. Such traditional play structures lack customization options, often resulting in a child's loss of interest. Furthermore, children's play structures are often accompanied by challenging installation processes and substantial financial investment, thus increasing the burden placed upon children's parents.

Traditional play structures for children typically include rigid components, constructed from materials such as wood and/or metal, and incorporate playthings like swings and slides. These structures often are packaged for sale in kits with a vast array of hardware, making assembly a daunting task. Additionally, once assembled, the difficulty in moving or disposing of children's play structures becomes apparent, which is exacerbated when a child ages and outgrows said play structure.

Current play structures, characterized by their heavy rigid walls and fixed connections, resist easy modification and modernization to facilitate extended use throughout larger portions of children's lives. Similarly, these structures cater to specific age ranges and play patterns, requiring parents to predict their child's play preferences years in advance when purchasing such a structure. This lack of adaptability results in play structures becoming outdated and less engaging as children grow.

There is a clear need for innovative apparatuses and methods offering play structures with variable sizes and configurations.

Consequently, it is desirable to provide play structures featuring easy assembly and relocation methods. Additionally, it is desirable to have play structures that are capable of being adapted to the evolving play styles of growing children, ensuring continued engagement and enjoyment.

Furthermore, it is desirable to introduce play structures that can effortlessly collapse, be moved, and/or stored, addressing the challenges associated with permanence and inflexibility in traditional play structures. This adaptability would not only enhance the overall play experience but also provide practical benefits for families in terms of convenience and space management.

SUMMARY

This Summary is provided to introduce a selection of concepts in a simplified form that are further described below in the Detailed Description. This Summary is not intended to identify key features or essential features, nor is it intended to limit the scope of the claims included herewith.

Provided may be a junction assembly comprising: a primary hub (the primary hub comprising: one or more primary hub sidewalls, and one or more primary hub angular members); a top member disposed atop the primary hub; a secondary hub disposed below the primary hub; and one or more brackets pivotably coupled to at least one of the primary hub and the secondary hub.

In an embodiment, the secondary hub is comprised of a secondary hub top wall and one or more secondary hub angular members. In another embodiment, the one or more primary hub angular members are interfacing the one or more secondary hub angular members.

In an embodiment, the junction assembly may further comprise a junction assembly void defined by the top member, the one or more primary hub sidewalls, and the secondary hub top wall.

In a further embodiment, each of the one or more brackets are comprised of one or more bracket stems; one or more bracket top walls; one or more bracket sidewalls; and one or more bracket apertures.

In another embodiment, the one or more bracket stems of the junction assembly may be pivotably coupled to the one or more primary hub angular members and the one or more secondary hub angular members. In an embodiment, the one or more brackets may be configured to transpose between an engaged state and an unengaged state. In a further embodiment, in the engaged state, the one or more brackets protrude at an angle, and, in the unengaged state, the one or more brackets protrude in parallel.

In yet a further embodiment, the junction assembly void is configured to receive and securely house a rigid member. In an embodiment, the one or more brackets are configured to receive and securely house a rigid member in the engaged state. In another embodiment, the primary hub is further comprised of one or more primary hub top walls.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

Figure 1:
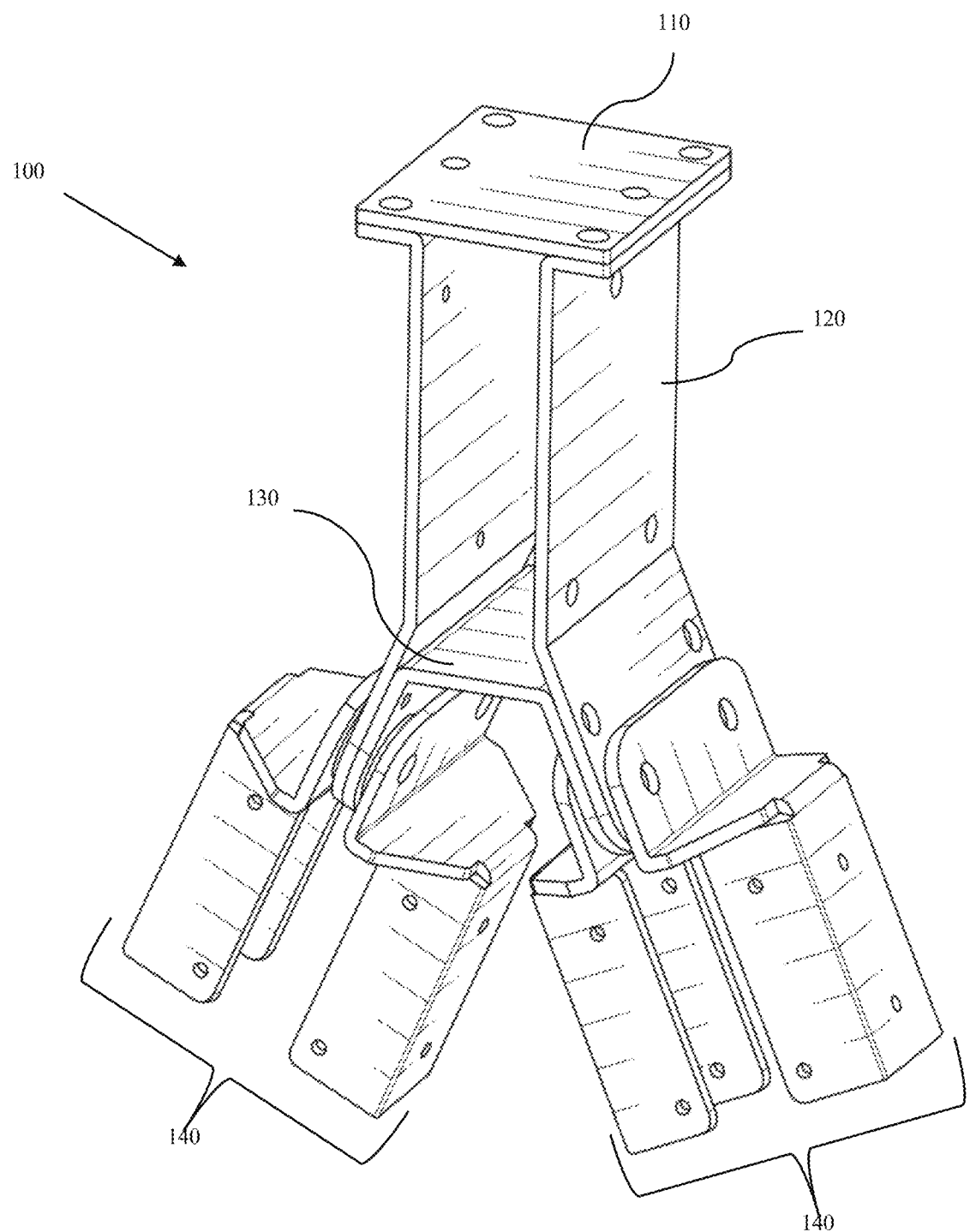
FIG. 1 is an illustration of a top front right perspective view of an embodiment of a junction assembly in an engaged state.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that the description herein is not intended as an extensive overview, and as such, concepts may be simplified in the interest of clarity and brevity.

All documents mentioned in this application are hereby incorporated by reference in their entirety. Any process described in this application may be performed in any order and may omit any of the steps in the process. Processes may also be combined with other processes or steps of other processes.

Referring to FIGS. 1-8, the junction assembly for accessory attachment to variable temporary structures (hereinafter the "junction assembly" or "the junction assembly 100") may be comprised of a plurality of components. The plurality of components may include at least one of a top member 110, a primary hub 120, a secondary hub 130, and one or more brackets 140. In an embodiment, the junction assembly 100 may be comprised of a rigid material. In such an embodiment, the rigid material may be a metal such as aluminum, steel, and/or stainless steel. However, any other suitable rigid material may constitute the junction assembly 100. As a nonlimiting example, the junction assembly 100 and/or components thereof may be manufactured via forging, milling, and/or additive manufacturing or 3D printing.

Figure 2:
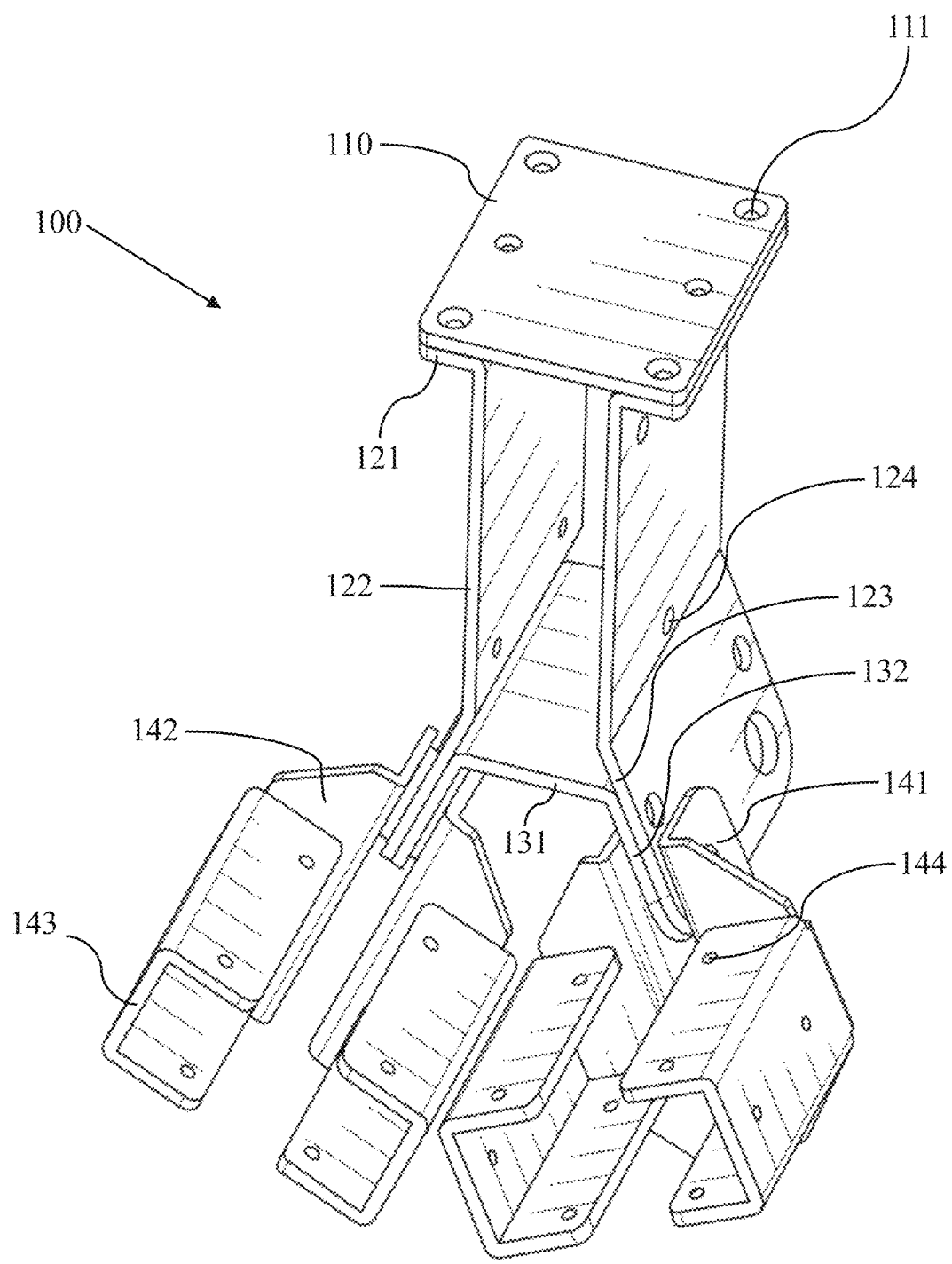
FIG. 2 is an illustration of a top front left perspective view of an embodiment of a junction assembly in an unengaged state.

The primary hub 120 may be comprised of one or more primary hub top walls 121, one or more primary hub sidewalls 122, and/or one or more primary hub angular members 123. In one embodiment, the primary hub 120 may be comprised of a single piece, for example, a unibody construction. In another embodiment, the primary hub 120 may be comprised of two or more pieces. As a nonlimiting example, the two or more pieces may be comprised of a first primary hub piece and a second primary hub piece. In a further embodiment, the one or more primary hub sidewalls 122 may be permanently affixed to and/or continuous with the one or more primary hub top walls 121 and/or the one or more primary hub angular members 123. As shown in FIG. 2, the primary hub 120 may comprise two halves, which when assembled in the junction assembly 100, are arranged in a mirrored orientation to one another.

In an embodiment, the one or more primary hub sidewalls 122 may be disposed between the one or more primary hub top walls 121 and the one or more primary hub angular members 123. In another embodiment, the one or more primary hub top walls 121 and/or the one or more primary hub angular members 123 may be orthogonal to the one or more primary hub sidewalls 122. In an alternative embodiment, at least one of the one or more primary hub top walls 121 and the one or more primary hub angular members 123 may not be orthogonal to the one or more primary hub sidewalls 122. As a nonlimiting example, the one or more primary hub top walls 121 may be orthogonal to the one or more primary hub sidewalls 122, while the one or more primary hub angular members 123 are not orthogonal to the one or more primary hub sidewalls 122, or vice versa. In a further nonlimiting example, both the one or more primary hub top walls 121 and the one or more primary hub angular members 123 may not be orthogonal to the one or more primary hub sidewalls 122.

The primary hub 120 may be further comprised of one or more primary hub apertures 124. In an embodiment, the one or more primary hub apertures 124 may be disposed on at least one of the one or more primary hub top walls 121, the one or more primary hub sidewalls 122, and the one or more primary hub angular members 123. In another embodiment, the one or more primary hub apertures 124 may be disposed on all, or a combination of, the one or more primary hub top walls 121, the one or more primary hub sidewalls 122, and the one or more primary hub angular members 123. In an additional embodiment, the one or more primary hub apertures 124 may traverse the primary hub 120, such that a first side of the primary hub may be in fluid communication with a second side of the primary hub. As a nonlimiting example, the one or more primary hub apertures 124 may be comprised of three apertures on the one or more primary hub top walls 121, three apertures on the one or more primary hub sidewalls 122, and four apertures on the one or more primary hub angular members 123. The one or more primary hub apertures 124 may be configured to receive at least one fastener (not pictured). In an embodiment, the at least one fastener may comprise one or more bolts, one or more screws, and one or more nails. However, the at least one fastener may be comprised of any suitable fastener alternative. The one or more primary hub apertures 124 may be staggered such that the one or more primary hub apertures 124 on a first side of the one or more primary hub sidewalls 122 would not cause a fastener extending through the first side to interfere with a fastener extending though the second side, and vice versa. Accordingly, the one or more primary hub apertures 124 may be offset relative to the opposing side of the primary hub 120. Thus, the location of the one or more primary hub apertures 124 allow a beam to be securely screwed from both sides of the primary hub 120.

The junction assembly 100 may be further comprised of the top member 110. The top member 110 may be comprised of one or more top member apertures 111. In an embodiment, the one or more top member apertures 111 may traverse the top member 110, such that a first side of the top member 110 may be in fluid communication with a second side of the top member. In another embodiment, the top member 110 may be an equilateral shape (e.g., a square). However, the top member 110 may be any suitable shape alternative. As a nonlimiting example, the one or more top member apertures 111 may be comprised of three apertures disposed on a first end of the top member and three apertures disposed on a second end of the top member.

The top member 110 may be reversibly coupled to the primary hub 120. In an embodiment, the top member 110 may be reversibly coupled to the one or more primary hub top walls 121. In such an embodiment, the one or more top member apertures 111 may align with the one or more primary hub apertures 124, wherein the at least one fastener may traverse said aligned apertures 111 & 124. As a nonlimiting example, the one or more top member apertures 111, disposed on the top member, may align with the one or more primary hub apertures 124, disposed on the one or more primary hub top walls 121. In such a nonlimiting example, the at least one fastener may traverse the aligned apertures to reversibly couple the top member 110 to the primary hub 120. In another embodiment, the top member 110 may be permanently affixed to the primary hub 120. As a nonlimiting example, the top member 110 may be welded to the primary hub 120. The one or more top member apertures 111 may be positioned, such that a standard piece of dimensional lumber may be disposed atop the top member 110. For example, a piece of dimensional lumber may traverse from a primary play structure assembly to the top member 110, wherein this additional piece of dimensional lumber decreases flexing of the main horizontal support beam. In an embodiment, any of the top member 110, the one or more primary hub top walls 121, and/or the one or more primary hub sidewalls 122 may be continuous. As a nonlimiting example, the one or more primary hub top walls 121 may be a component of the primary hub 120, wherein the visual and/or tactile distinction between both components is not readily apparent. Accordingly, the one or more primary hub top walls 121 and the top member 110 may be fused or otherwise viewed as a singular component.

Figure 3:
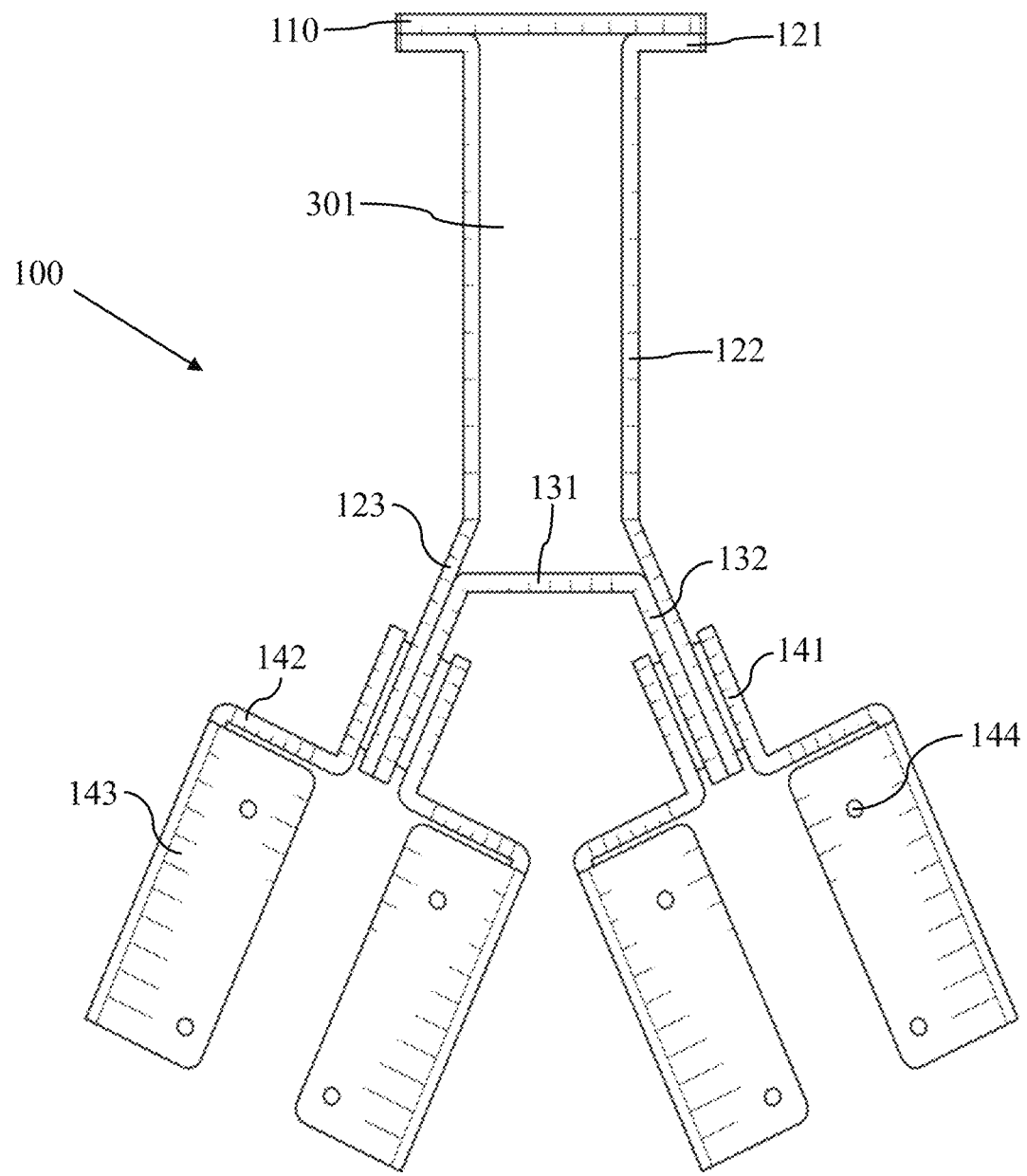
FIG. 3 is an illustration of a front view of a junction assembly in the engaged state.

The junction assembly 100 may be further comprised of the secondary hub 130. The secondary hub may be comprised of at least one of a secondary hub top wall 131, one or more secondary hub angular members 132, and one or more secondary hub apertures (not pictured). In an embodiment, the one or more secondary hub angular members 132 may be orthogonal to the secondary hub top wall 131. In an alternative embodiment, the one or more secondary hub angular members 132 may not be orthogonal to the secondary hub top wall 131. However, as shown in FIG. 3, the one or more secondary hub angular members 132 may be disposed at an obtuse angle relative to the secondary hub top wall 131. In an embodiment, any of the one or more secondary hub angular members 132, and/or the one or more primary hub angular members 123 may be continuous. As a nonlimiting example, the one or more secondary hub angular members 132 may be a component of the secondary hub 130, wherein the visual and/or tactile distinction between both components is not readily apparent. Accordingly, the one or more primary hub top walls 121 and the secondary hub 130 may be fused or otherwise viewed as a singular component.

The one or more secondary hub apertures may be disposed on at least one of the secondary hub top wall 131 and/or the one or more secondary hub angular members 132. In another embodiment, the one or more secondary hub apertures may be disposed on both the secondary hub top wall 131 and the one or more secondary hub angular members 132. In an additional embodiment, the one or more secondary hub apertures may traverse the secondary hub 130, such that a first side of the secondary hub is in fluid communication with a second side of the secondary hub. As a nonlimiting example, the one or more secondary hub apertures may be comprised of four apertures on the one or more secondary hub angular members 132. The one or more secondary hub apertures may be configured to receive the at least one fastener.

The secondary hub 130 may be reversibly coupled to the primary hub 120. In an embodiment, the secondary hub 130 may be reversibly coupled to the one or more primary hub angular members 123. In such an embodiment, the one or more secondary hub apertures may align with the one or more primary hub apertures 124, wherein the at least one fastener may traverse said aligned apertures. As a nonlimiting example, the one or more secondary hub apertures, disposed on the one or more secondary hub angular members 132, may align with the one or more primary hub apertures 124, which may be disposed on the one or more primary hub angular members 123. In such a nonlimiting example, the at least one fastener may traverse the aligned apertures to reversibly couple the secondary hub 130 to the primary hub 120. In another embodiment, the secondary hub 130 may be permanently affixed to the primary hub 120. As a nonlimiting example, the secondary hub 130 may be welded to the primary hub 120.

The junction assembly 100 may be further comprised of the one or more brackets 140. The one or more brackets may be comprised of at least one of one or more bracket stems 141, one or more bracket top walls 142, one or more bracket sidewalls 143, and one or more bracket apertures 144. In one embodiment, the one or more brackets 140 may be comprised of a single piece. In another embodiment, the one or more brackets 140 may be comprised of two or more pieces. As a nonlimiting example, the two or more pieces may be comprised of a first bracket piece and a second piece.

In an embodiment, the one or more bracket stems 141 may be orthogonal to the one or more bracket top walls 142. In an alternative embodiment, the one or more bracket stems 141 may not be orthogonal to the one or more bracket top walls 142. Further, the one or more bracket stems 141 may be permanently affixed to the one or more bracket top walls 142. In another embodiment, the one or more bracket top walls 142 may be orthogonal to the one or more bracket sidewalls 143. As a nonlimiting example, the first bracket piece and the second bracket piece may be comprised of three sidewalls (respectively, a first sidewall, a second sidewall, and a third sidewall.) In such a nonlimiting example, a top edge of the first sidewall may be permanently affixed to the one or more bracket top walls 142, wherein the first sidewall is orthogonal to the one or more bracket top walls 142. Further, the second sidewall and the third sidewall may be permanently affixed to at least one of a right edge and a left edge of the first sidewall, wherein the second and third sidewalls are orthogonal to the first sidewall.

Furthermore, the one or more brackets 140 may be configured to receive a rigid member. Upon receipt of the rigid member, the one or more brackets 140 may be configured to securely house said rigid member, wherein said securable housing may proscribe the movement of the rigid member. In an embodiment, the rigid member may be a standard piece of dimensional lumber. As a nonlimiting example, the standard piece of lumber may be at least one of an 8, 10, and/or 12 foot 2×4 piece of lumber. However, the one or more brackets 140 may be sized to accept any common lumber dimension. Alternatively, the rigid member may be any member sufficiently sturdy to support the weight of a human child, a human adult, and/or a play structure 900. As an additional nonlimiting example, the rigid member may be comprised of PVC pipe, copper pipe, carbon fiber, polymer, and/or any other suitable material. In an embodiment, the rigid member may include an A-frame 930 (depicted in FIGS. 9 & 10). In a nonlimiting example, the one or more bracket top walls 142 and the one or more bracket sidewalls 143 may be configured to receive and/or securely house the rigid member, wherein said securable housing may proscribe the movement of the rigid member.

The one or more bracket apertures 144 may be disposed on the one or more bracket stems 141, the one or more bracket top walls 142, and/or the one or more bracket sidewalls 143. In another embodiment, the one or more bracket apertures 144 may be disposed on all, or a combination of, the one or more bracket stems 141, the one or more bracket top walls 142, and/or the one or more bracket sidewalls 143. In an additional embodiment, the one or more bracket apertures 144 may traverse the one or more brackets 140, such that a first side of the one or more brackets 140 is in fluid communication with a second side of the one or more brackets 140. As a nonlimiting example, the one or more bracket apertures 144 may be comprised of two apertures disposed on the one or more bracket stems 141 and six apertures disposed on the one or more bracket sidewalls 143. The one or more bracket apertures 144 may be configured to receive the at least one fastener.

The one or more brackets 140 may be reversibly coupled to at least one of the primary hub 120 and/or the secondary hub 130. In an embodiment, the one or more brackets 140 may be pivotably coupled to the primary hub 120 and/or the secondary hub 130. In such an embodiment, the one or more brackets 140 may be able to pivot about a fixed point, wherein the fixed point may be the at least one fastener. As a nonlimiting example, the one or more bracket apertures 144 may align with at least one of the one or more primary hub apertures 124 and the secondary hub apertures, wherein the at least one fastener may traverse said aligned apertures. As a further nonlimiting example, the one or more bracket apertures 144, disposed on the one or more bracket stems 141, may align with the one or more primary hub apertures 124, disposed on the one or more primary hub angular members 123 and/or the one or more secondary apertures disposed on the one or more secondary hub angular members 132. In such a nonlimiting example, the at least one fastener may traverse the aligned apertures to reversibly couple the one or more brackets 140 to the primary hub 120 and/or the secondary hub 130.

In a further embodiment, the one or more brackets 140, pivotably coupled to the primary hub 120 and/or the secondary hub 130, may be configured to transpose between an engaged state and an unengaged state. In the engaged state, the one or more brackets 140 may be configured to receive and/or securely house a rigid member, wherein said secure housing may proscribe the movement of such rigid members. In the engaged state, the one or more brackets 140 may be positioned such that the host rigid members are disposed at an angle relative to each other, for example, to form a suitable stand to support an extension to weight bearing play structures. In the unengaged state, the one or more brackets 140 may be positioned such that the host rigid members are parallel, allowing a user to easily store and move the combination of the rigid members and the junction assembly 100. A user may transpose the one or more brackets 140 from the engaged state to the unengaged state via mechanical actuation.

Figure 4:
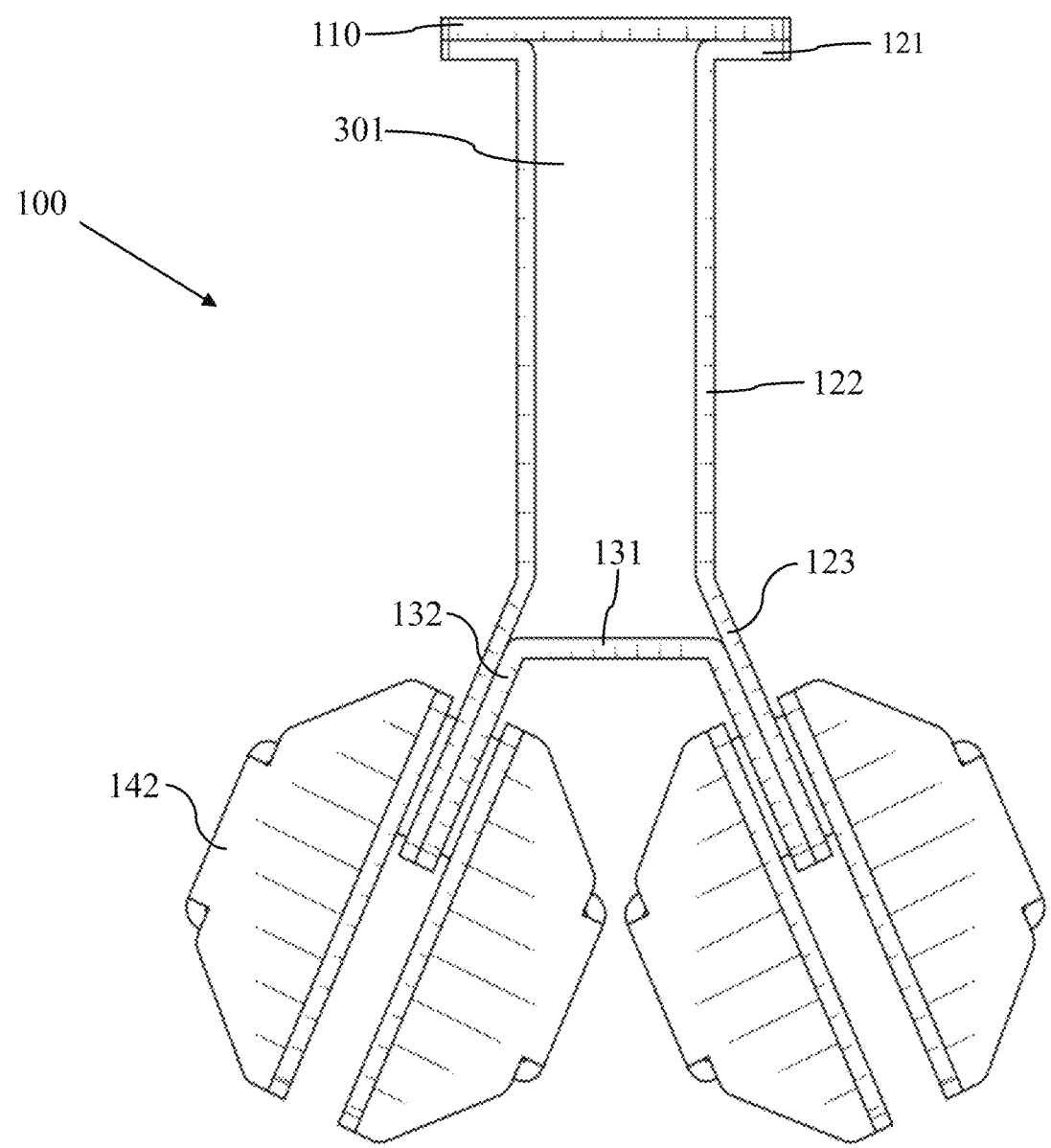
FIG. 4 is an illustration of a front view of a junction assembly in the unengaged state.
Figure 5:
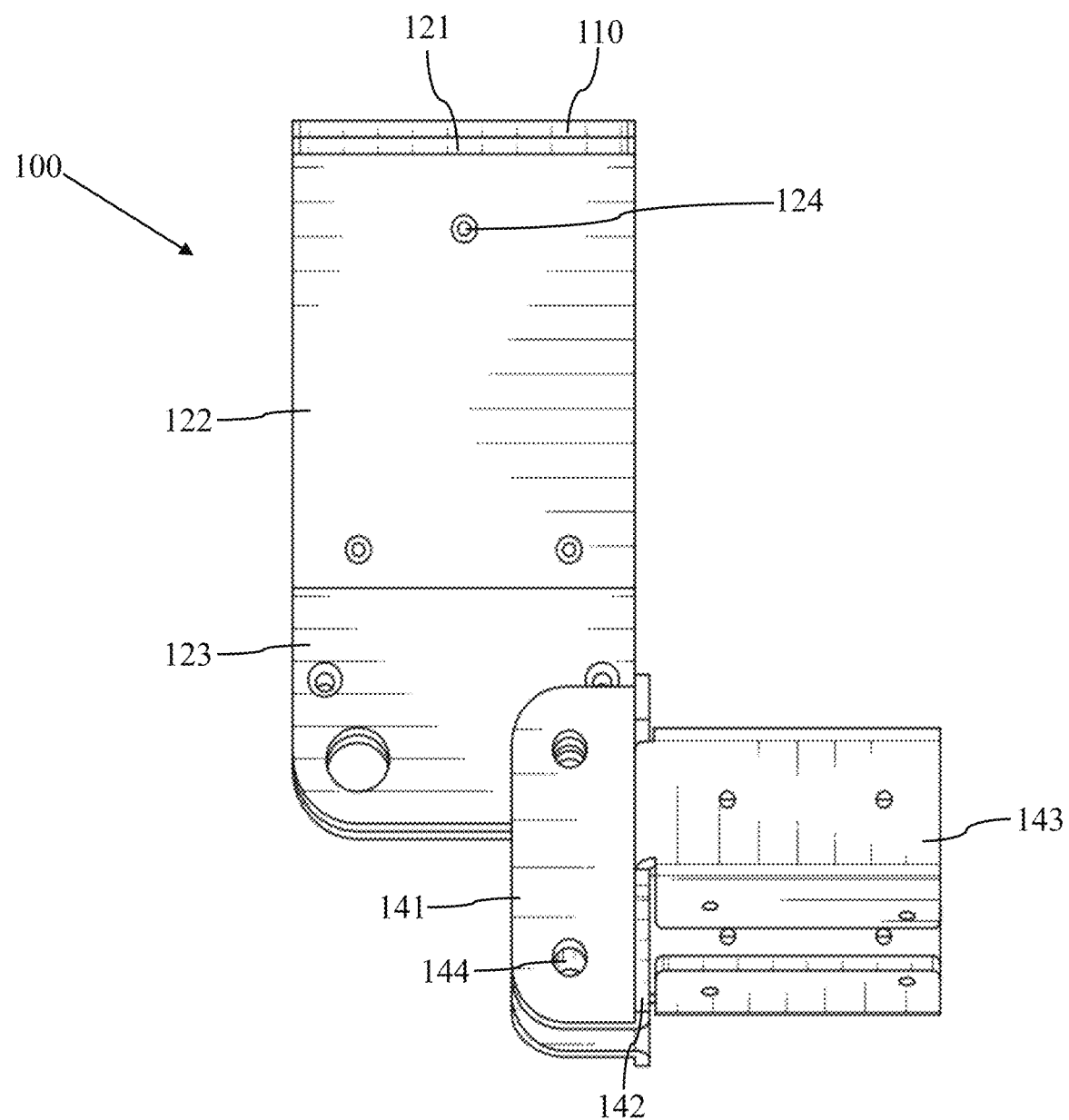
FIG. 5 is an illustration of a right side view of a junction assembly in the unengaged state.
Figure 6:
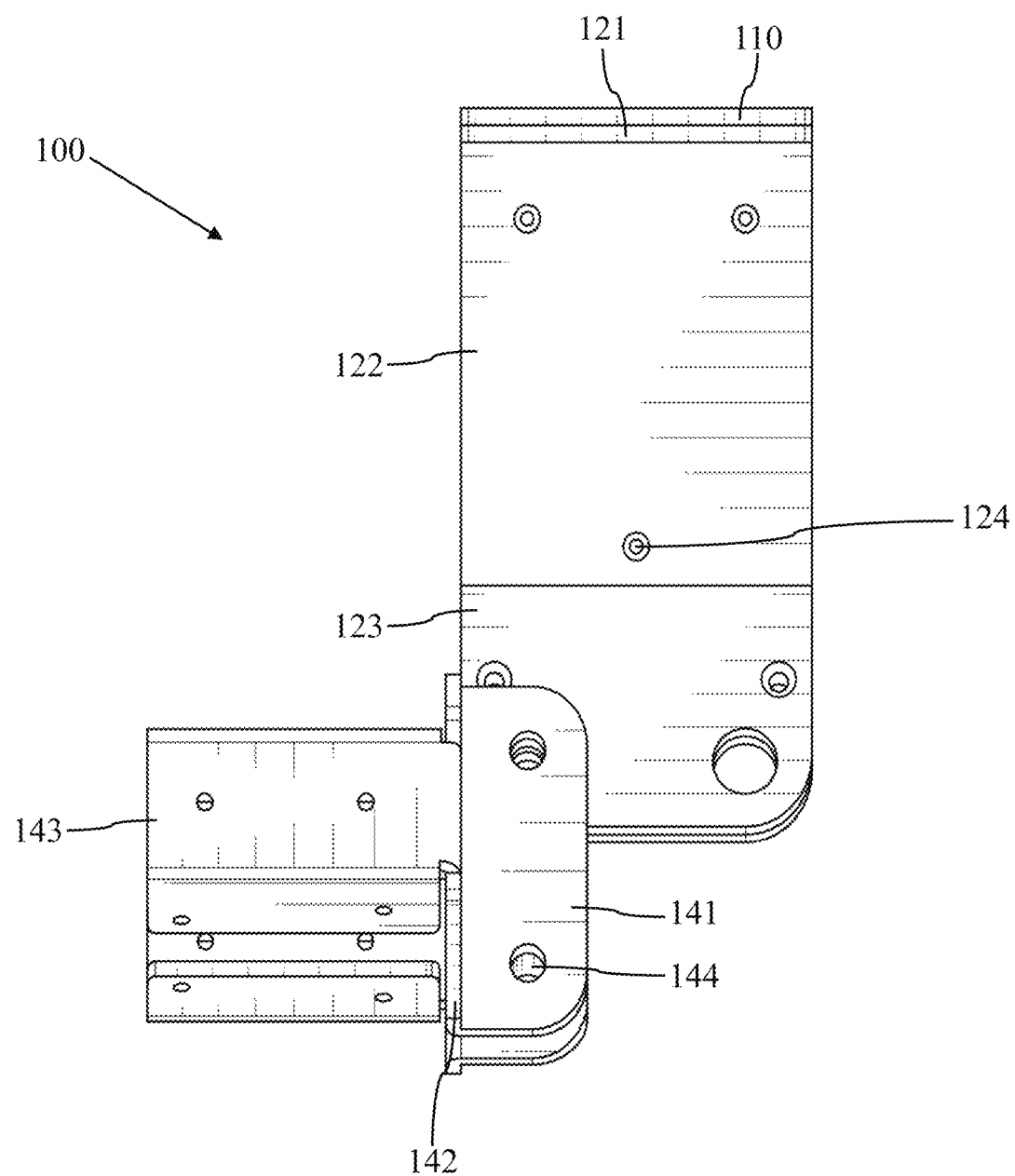
FIG. 6 is an illustration of a left side view of a junction assembly in the unengaged state.
Figure 7:
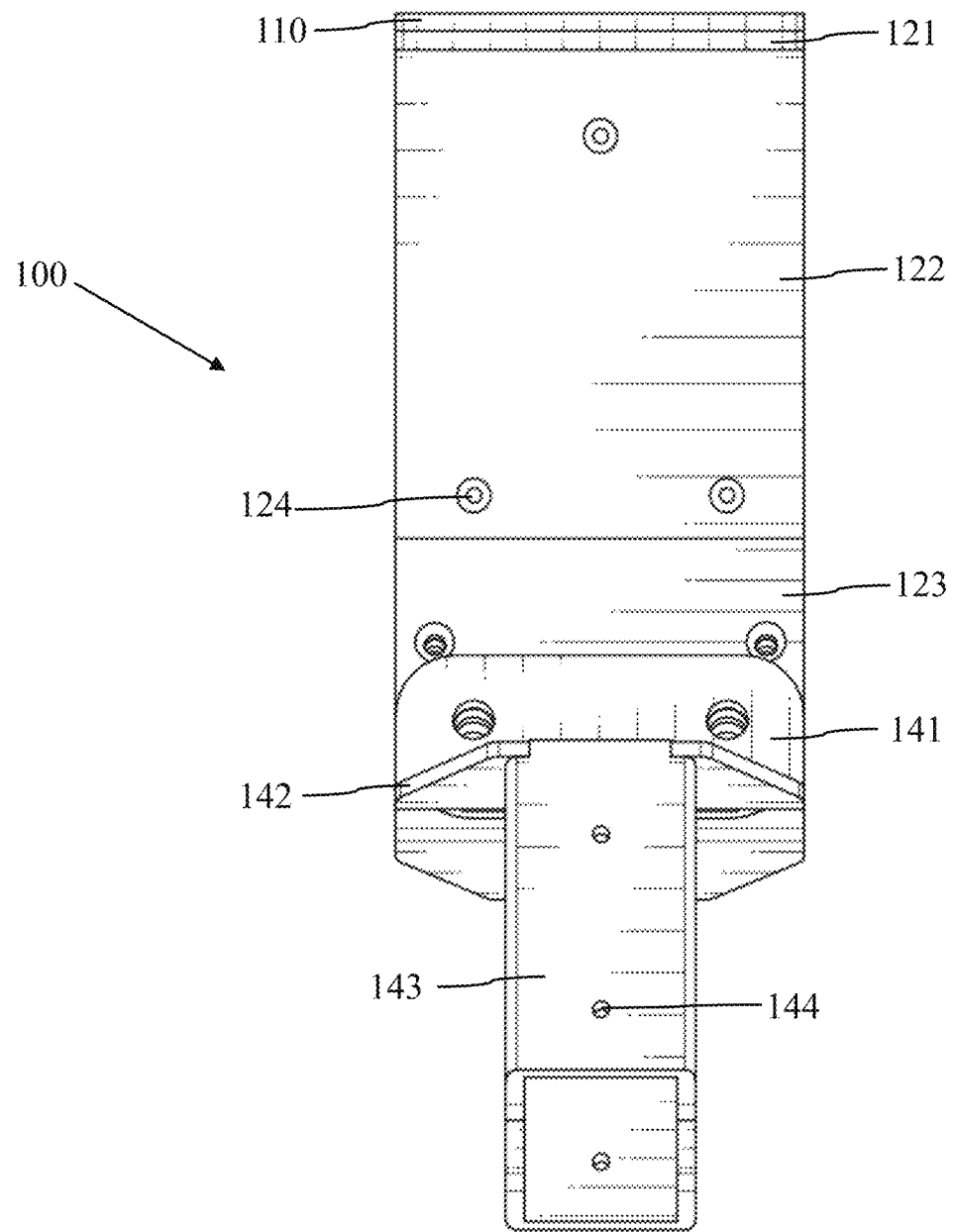
FIG. 7 is an illustration of a right side view of a junction assembly in the engaged state.
Figure 8:
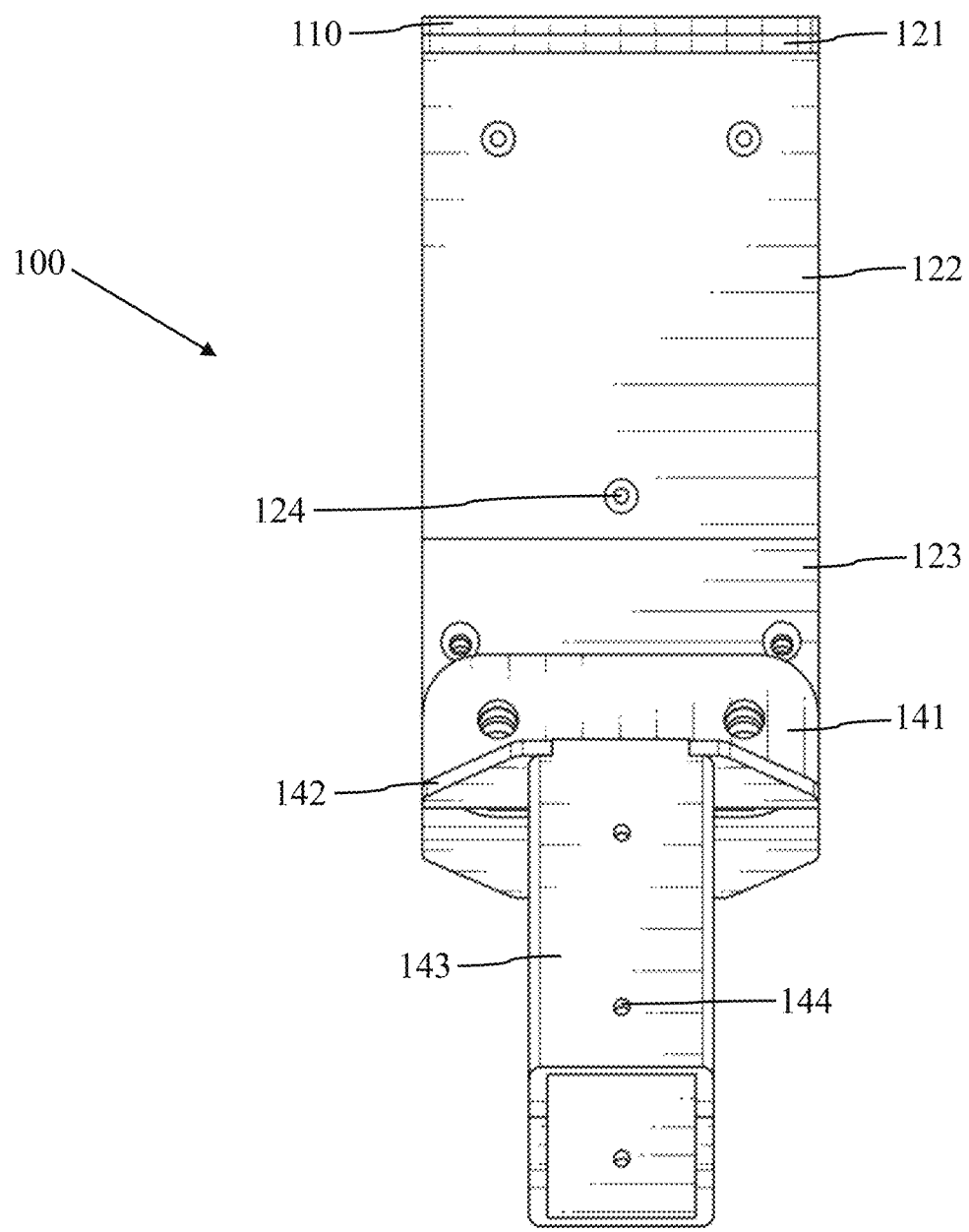
FIG. 8 is an illustration of a left side view of a junction assembly in the engaged state.

The junction assembly 100 may be further comprised of a junction assembly void 301 (depicted in FIGS. 3 & 4). In an embodiment, the junction assembly void 301 may be defined by at least one of the secondary hub top wall 131, the top member 110, and the one or more primary hub sidewalls 122. Such a void 301 may be configured to receive and/or securely house the rigid member, wherein said secure housing may proscribe the movement of the rigid member. In an embodiment, the rigid member may be a crossbar 910 (depicted in FIGS. 9 & 10).

Figure 9:
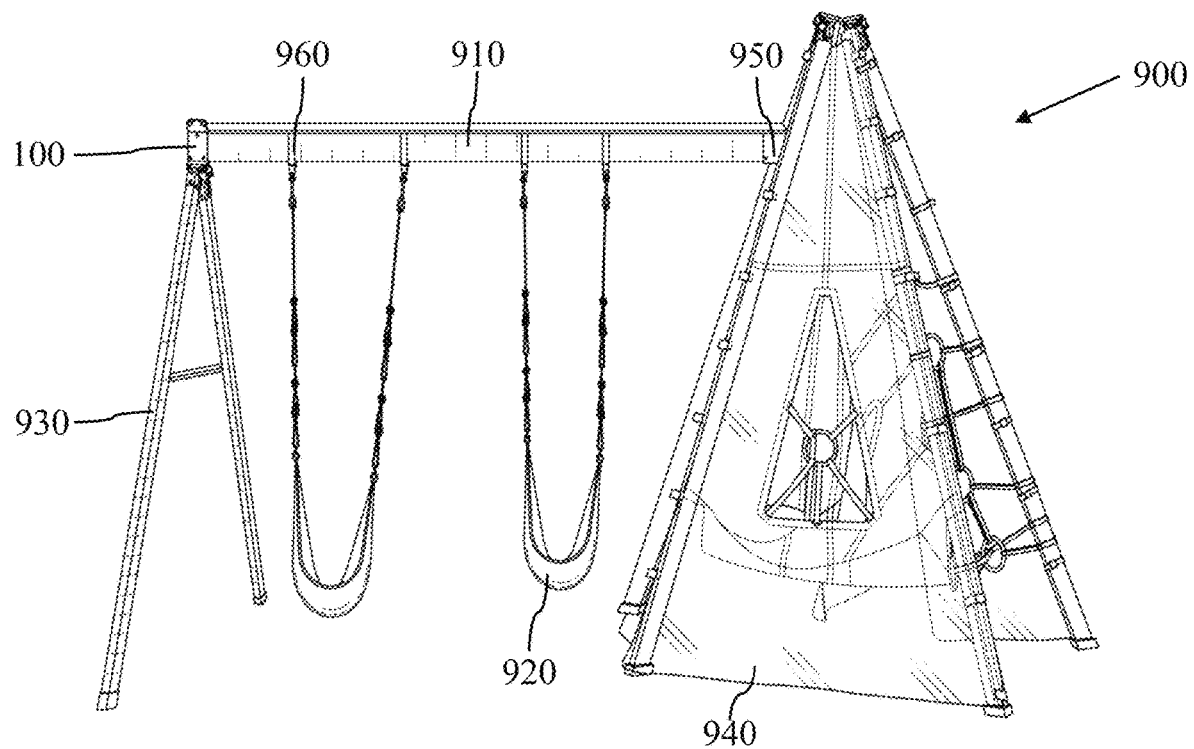
FIG. 9 is an illustration of an embodiment of a play structure utilizing a junction assembly.
Figure 10:
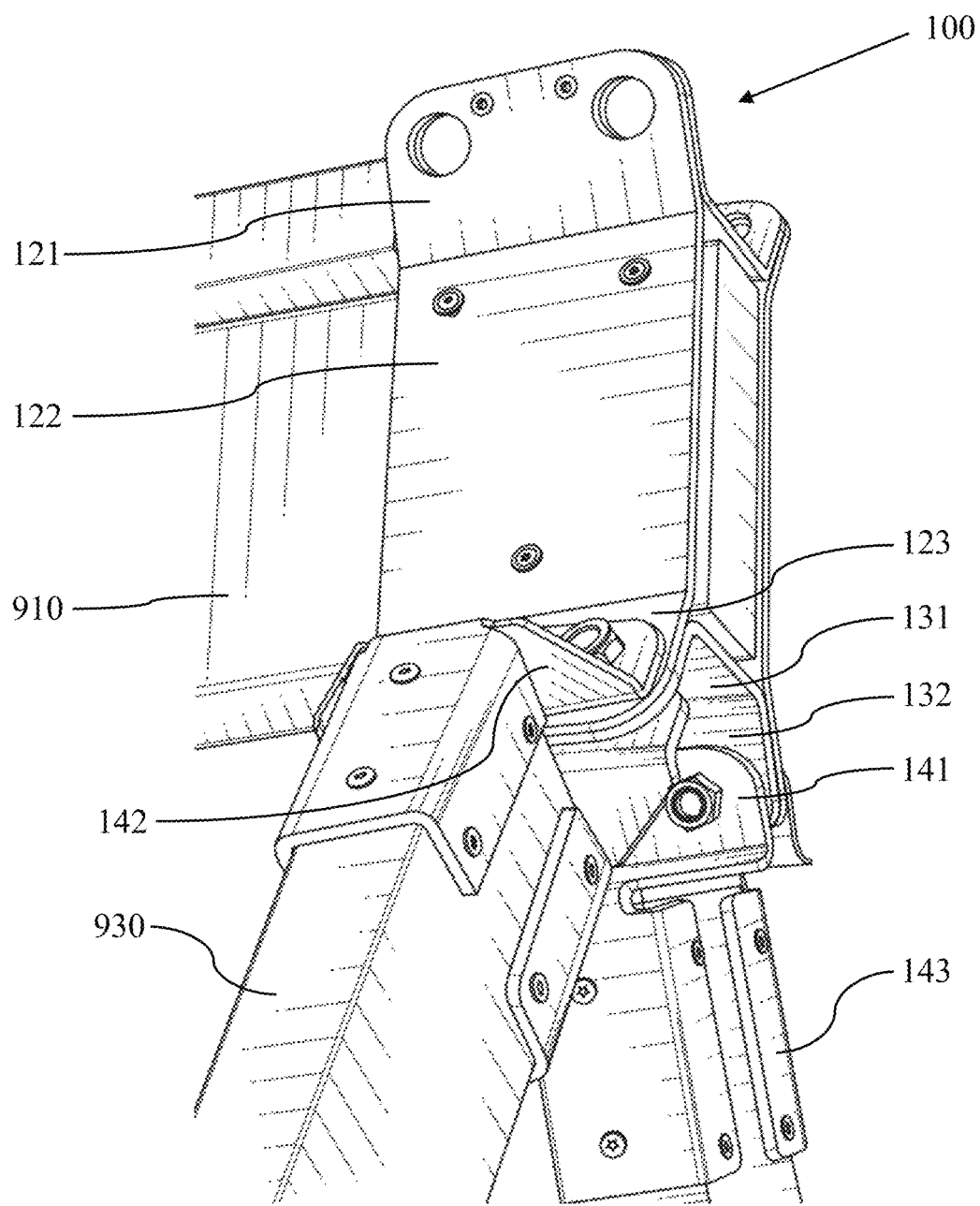
FIG. 10 is an illustration of an embodiment of the junction assembly being utilized with a play structure.

Turning to FIGS. 9 and 10, the junction assembly 100 may be configured to facilitate the assembly of the play structure 900. In an embodiment, the play structure 900 may be comprised of the junction assembly 100, the crossbar 910, one or more crossbar attachments 920, the A-frame 930, and/or an accessory structure 940. In another embodiment, the play structure 900 may be further comprised of an accessory structure assembly bracket 950 and/or a crossbar attachment bracket 960. Further, the junction assembly 100 may be integrated within a previously assembled play structure, including the accessory structure 940, to add at least one of the crossbar 910, the one or more crossbar attachments 920, and the A-frame 930 to said previously assembled play structure via the accessory structure assembly bracket 950 (described below). In an embodiment, the one or more crossbar attachments 920 may be comprised of one or more swings (e.g., rope swings, belt swings, etc.), one or more workout rings, one or more trapeze bars, etc.

In an embodiment, the one or more crossbar attachments 920 may be permanently affixed to the crossbar 910. In a different embodiment, the one or more crossbar attachments 920 may be reversibly coupled to the crossbar 910. In such an embodiment, the reverse coupling of the one or more crossbar attachments 920 to the crossbar 910 may be facilitated by at least one of a clevis, an S-Hook, a spring clip, a QuickLink, and a carabiner. In a further embodiment, the one or more crossbar attachments 920 may be permanently affixed or reversibly coupled to the crossbar 910 via the crossbar attachment bracket 960 (described below).

In an embodiment, the junction assembly 100, in the engaged state, may be configured to receive and/or securely house at least one of the crossbar 910 and the A-frame 930. In such an embodiment, the one or more primary hub apertures 124, the top member apertures 111, and/or the one or more bracket apertures 144 may be configured to facilitate the securable housing of at least one of the crossbar 910 and/or the A-frame 930. As a nonlimiting example, the crossbar 910, having been received by the void 301, may be securely housed by the junction assembly 100 via the one or more primary hub apertures 124 and/or the one or more top member apertures 111. In such a nonlimiting example, the at least one fastener may traverse the one or more primary hub apertures 124 and/or the one or more top member apertures 111 to securely house the crossbar 910.

In a further nonlimiting example, the A-frame 930, having been received by the one or more brackets 140, may be securely housed by the junction assembly 100 via the one or more bracket apertures 144. In such a nonlimiting example, the at least one fastener may traverse the one or more bracket apertures 144 to securely house the A-frame 930.

The junction assembly 100 may decrease the effort required to assemble a play structure 900. As a nonlimiting example, the junction assembly 100 may enable a user, building the play structure 900, to quickly assemble a swing set, comprised of the crossbar 910, the one or more crossbar attachments, and/or the A-frame 930. The junction assembly 100 may also enable the user to customize the play structure 900 quickly and efficiently to best suit the needs of a child. In such an embodiment, the user may utilize the junction assembly 100 to attach at least one of the crossbar 910 and the A-frame 930 to the accessory structure 940 for temporary use. Further, the plurality of components comprising the junction assembly 100, may facilitate efficient user storage of said junction assembly 100. In an embodiment, the top member 110, the primary hub 120, the secondary hub 130, and/or the one or more brackets 140 are able to be reversibly coupled to one another. Such reverse couplability allows the user to easily assemble and disassemble the junction assembly 100. In an embodiment, the components of the junction assembly 100 are not separable. Further, said reverse couplability allows the user to store the junction assembly 100 in at least one of an assembled state and a disassembled state. Additionally, the junction assembly 100 may enable the user to temporarily assemble the play structure 900. In an embodiment, the user may permanently assemble the accessory structure, and temporarily assemble the crossbar 910, the one or more crossbar attachments, and/or the A-frame 930 utilizing the junction assembly 100.

As depicted in FIG. 10, the one or more primary hub top walls 121 may not be orthogonal to the one or more primary hub sidewalls 122. In such an embodiment, the one or more primary hub top walls 121 may be disposed at an obtuse angle relative to the one or more primary hub sidewalls 122. Further, the top member 110 may further comprise one or more top member angular members (not depicted) and a top member top wall, wherein the one or more top member angular members are disposed at an obtuse angle relative to the top member top wall. In such an embodiment, the one or more primary hub top walls 121 may interface with the one or more top member angular members.

The play structure may be comprised of a secondary crossbar (not depicted). In an embodiment, the secondary crossbar may be permanently affixed to the junction assembly 100. In another embodiment, the secondary crossbar may be reversibly coupled to the junction assembly 100. In such an embodiment, the secondary crossbar may rest atop the top member 110 of the junction assembly 100. As a nonlimiting example, the secondary crossbar, resting atop the top member 110, may prevent the crossbar 910 from sagging due to use of the one or more crossbar attachments 920. In a further nonlimiting example, the secondary crossbar, resting atop the top member 110, may prevent the crossbar 910 from being over torqued due to use of the one or more crossbar attachments 920. In yet a further embodiment, the top member 110 may be configured to support the rigid member, such that the rigid member rests atop the top member 110. In such an embodiment, the rigid member, atop the top member 110, may prevent another rigid member from sagging and/or being over torqued.

Figure 11:
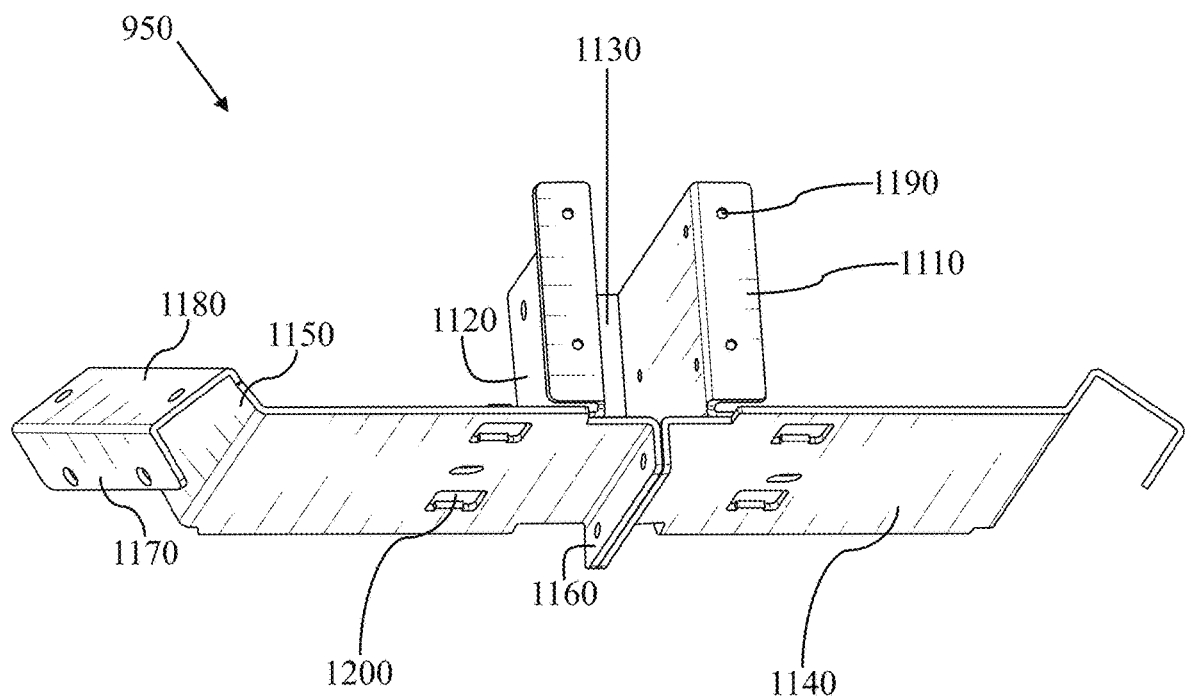
FIG. 11 is an illustration of an embodiment of an accessory structure assembly bracket.
Figure 12:
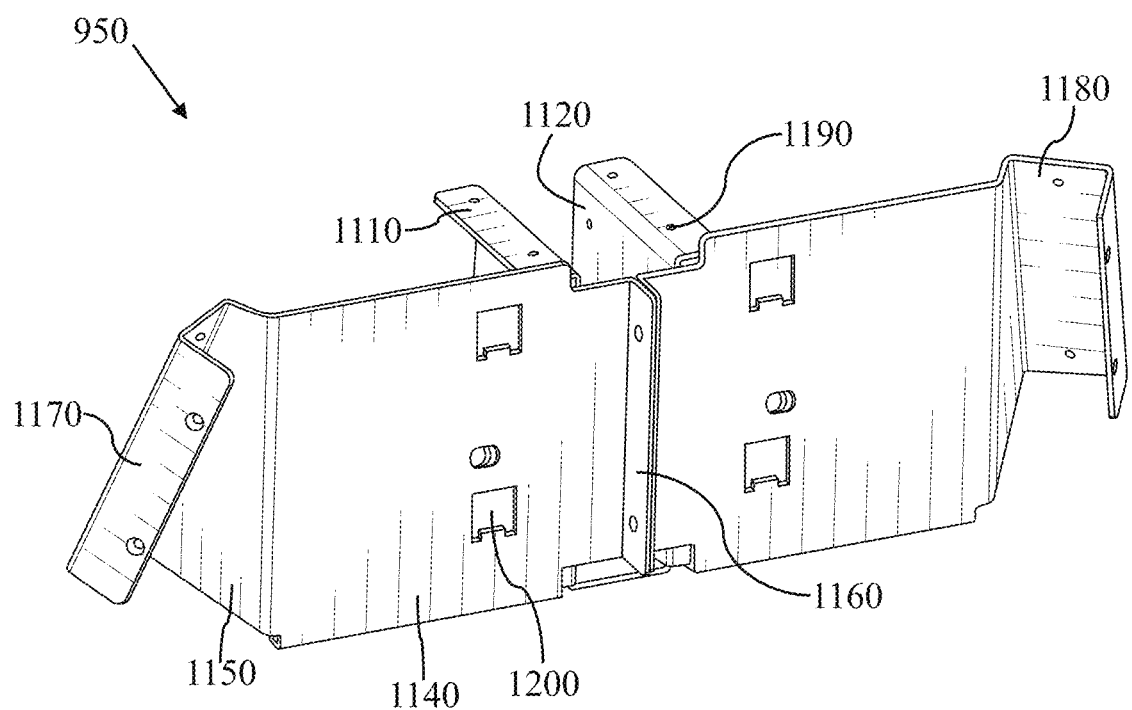
FIG. 12 is an illustration of an embodiment of the accessory structure assembly bracket.

Referring to FIGS. 11 and 12, assembly of the play structure 900 may be further facilitated by the accessory structure assembly bracket (the "accessory bracket" or "accessory bracket 950"). In an embodiment, the accessory bracket 950 may facilitate reverse coupling of the crossbar 910 and the accessory structure 940. In an embodiment, the accessory bracket 950 may be comprised of a crossbar support and/or one or more wings. The crossbar support may be comprised of at least one of one or more support top walls 1110, one or more support sidewalls 1120, a support bottom wall 1130, and one or more support flanges (not pictured). In another embodiment, the one or more support sidewalls 1120 may be disposed between the one or more support top walls 1110 and the support bottom wall 1130.

The crossbar support may be further comprised of one or more support apertures 1190. In an embodiment, the one or more support apertures 1190 may be disposed on at least one of the one or more support top walls 1110, the one or more support sidewalls 1120, the support bottom wall 1130, and the one or more support flanges. In another embodiment, the one or more support apertures 1190 may be disposed on all, or a combination of, the one or more support top walls 1110, the one or more support sidewalls 1120, the support bottom wall 1130, and the one or more support flanges. In an additional embodiment, the one or more support apertures 1190 may traverse the crossbar support, such that a first side of the crossbar support is in fluid communication with a second side of the crossbar support. Additionally, the one or more support apertures 1190 may be configured to receive the at least one fastener.

The one or more support top walls 1110 may be permanently affixed to the one or more support sidewalls 1120. As a nonlimiting example, the one or more support top walls 1110 may be welded to the one or more support sidewalls 1120. In such an example, the one or more support top walls 1110 and the one or more support sidewalls 1120 may be continuous, wherein the visual and/or tactile distinction between both components is not readily apparent. In an embodiment, the one or more support top walls 1110 and the one or more support sidewalls 1120 may be comprised of a first support top wall, a second support top wall, a first support sidewall and a second support sidewall. In such an embodiment, the first support top wall and/or the second support top wall may be coupled to at least one of the first support sidewall and the second support sidewall.

The support bottom wall 1130 may be permanently affixed to the one or more support sidewalls 1120. In an embodiment, the one or more support sidewalls 1120 may be welded to the support bottom wall 1130, wherein the one or more support sidewalls 1120 and the support bottom wall 1130 may be continuous. The continuous affixation between the one or more support sidewalls 1120 and the support bottom wall 1130 may proscribe a visual and/or tactile distinction between both components. As a nonlimiting example, the first support sidewall and the second support sidewall may be disposed upon opposite ends of the support bottom wall 1130, such that a space is created between the first and second support sidewalls. In a further embodiment, the space may correspond to a width of the support bottom wall 1130 and a height of the one or more support sidewalls 1120.

Additionally, the one or more support flanges may be permanently affixed to the one or more support sidewalls 1120. In an embodiment, the one or more support flanges may be orthogonal to the one or more support sidewalls 1120. As a nonlimiting example, the one or more flanges may be comprised of a first support flange and a second support flange, wherein the first support flange is permanently affixed to the first sidewall and the second support flange is permanently affixed to the second sidewall. In such an example, the first support flange may be orthogonal to the first support sidewall and the second support flange may be orthogonal to the second support sidewall.

The crossbar support may be configured to receive the rigid member. In an embodiment, the rigid member may be the crossbar 910. In such an embodiment, the space, defined by the one or more support sidewalls 1120 and the support bottom wall 1130, may be configured to receive the crossbar 910. In yet a further embodiment, the one or more top walls 1110 may be configured to support the rigid member, such that the rigid member rests atop the one or more top walls 1110. In such an embodiment, the rigid member, atop the one or more top walls 1110, may prevent another rigid member from sagging and/or being over torqued. In an alternative embodiment, the secondary crossbar may be at least one of permanently affixed and reversibly coupled to the accessory bracket 950. In such embodiments, the secondary crossbar may rest atop the one or more top walls 1110 of the accessory bracket 950. As a nonlimiting example, the secondary crossbar, resting atop the one or more top walls 1110, may prevent the crossbar 910 from sagging due to use of the one or more crossbar attachments 920. In a further nonlimiting example, the secondary crossbar, resting atop the one or more top walls 1110, may prevent the crossbar 910 from being over torqued due to use of the one or more crossbar attachments 920.

The accessory bracket 950 may be further comprised of the one or more wings. In an embodiment, the one or more wings may be comprised of one or more wing baseplates 1140, one or more wing angular members 1150, one or more wing flanges 1160 and/or one or more wing brackets. In such an embodiment, the one or more wing baseplates 1140 may be disposed between the one or more wing angular members 1150 and the one or more wing flanges 1160. Further, the one or more wing angular members 1150 may be disposed between the one or more wing baseplates 1140 and the one or more wing brackets. In another embodiment, the one or more wing brackets may be comprised of one or more wing bracket sidewalls 1170 and a wing bracket top wall 1180.

In an embodiment, the one or more wings may be permanently affixed to the crossbar support. In such an embodiment, the one or more support sidewalls 1120 may be affixed to the one or more wing baseplates 1140. As a nonlimiting example, the first or second support sidewalls may be affixed to at least one of a first wing baseplate and a second wing baseplate.

In an alternative embodiment, the one or more wings may be reversibly coupled to the crossbar support. In such an embodiment, the one or more wings may be comprised of one or more wing apertures 1200, wherein said apertures 1200 may be disposed upon at least one of the one or more wing baseplates 1140, the one or more wing angular members 1150, the one or more wing flanges 1160, and the one or more wing brackets. Further, the one or more support apertures 1190 may align with the one or more wing apertures 1200, such that the fastener may traverse both sets of apertures 1190 and 1200 to reversibly couple the crossbar support to the one or more wings. In an additional embodiment, the one or more wings may be comprised of a first wing and a second wing having the first wing baseplate and the second wing baseplate, respectively. In such an embodiment, the first wing baseplate may be reversibly coupled to the first support flange and the second wing baseplate may be reversibly coupled to the second support flange via the fastener traversing the one or more support apertures 1190 and the one or more wing apertures 1200, while said apertures 1190 and 1200 are aligned. Furthermore, a first wing flange and a second wing flange may interface, thus strengthening the affixation between the one or more wings and the crossbar support.

The one or more wing brackets, comprised of the one or more wing bracket sidewalls 1170 and the wing bracket top wall 1180, may be configured to support the rigid member. In an embodiment, the one or more wing angular members 1150, the one or more wing bracket sidewalls 1170, and the wing bracket top wall 1180 may define a receptacle sized to receive the rigid member. In another embodiment, the one or more wing brackets may be configured to receive the rigid member, while said member is disposed at an angle relative to the crossbar 910.

Figure 13:
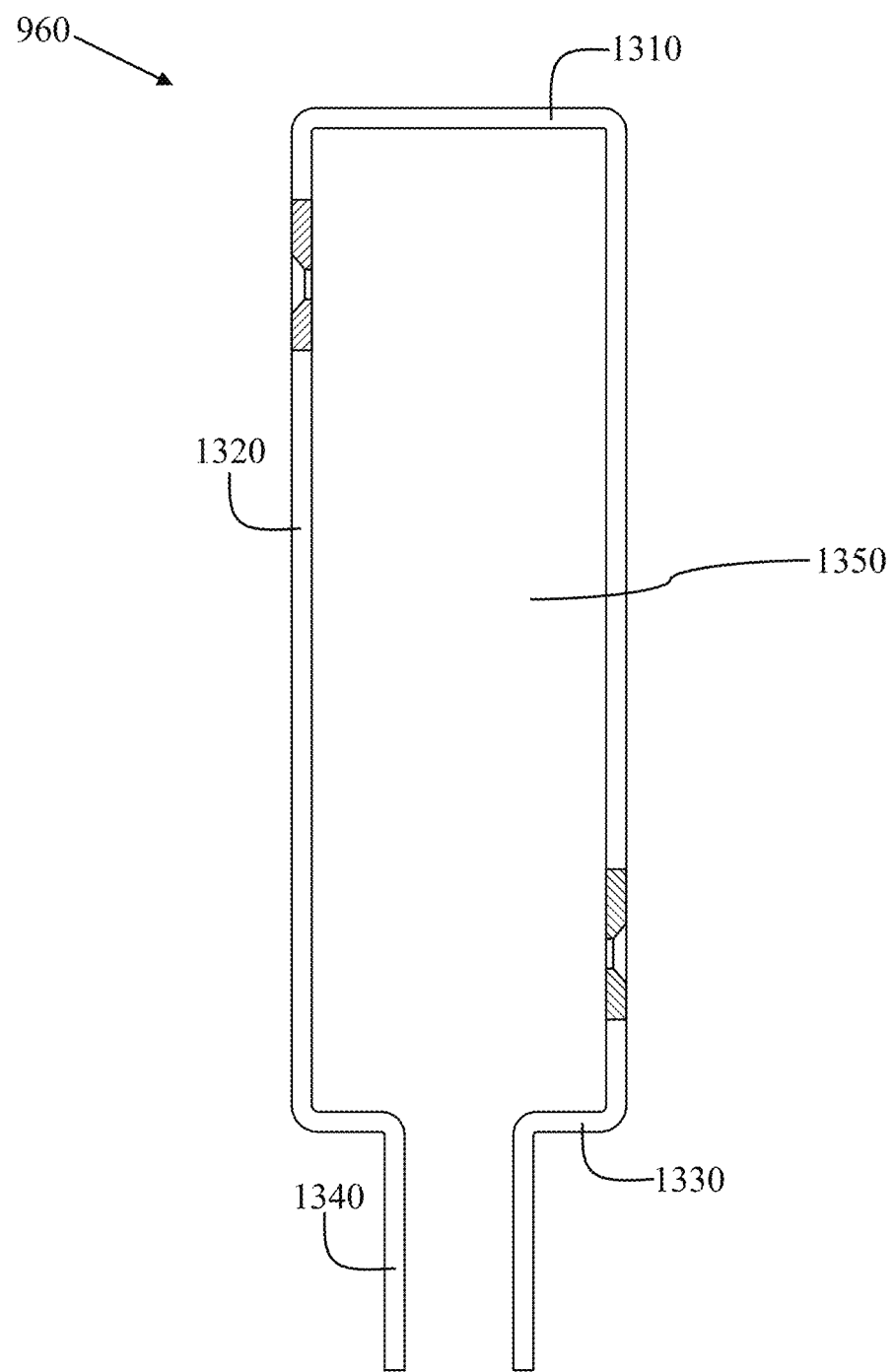
FIG. 13 is an illustration of an embodiment of a crossbar attachment bracket.

Turning to FIG. 13, the play structure may be further comprised of the crossbar attachment bracket 960. In an embodiment, the crossbar attachment bracket 960 may facilitate reverse coupling between the crossbar 910 and the one or more crossbar attachments 920.

The crossbar attachment bracket may be comprised of an attachment bracket top wall 1310, one or more attachment bracket sidewalls 1320, one or more attachment bracket bottom walls 1330, and one or more attachment bracket flanges 1340. In an embodiment, the one or more attachment bracket sidewalls 1320 may be disposed between the attachment bracket top wall 1310 and the one or more attachment bracket bottom walls 1330. Further, the one or more attachment bracket bottom walls 1330 may be disposed between the one or more attachment bracket sidewalls 1320 and the one or more attachment bracket flanges 1340.

The attachment bracket top wall 1310, the one or more attachment bracket sidewalls 1320, and the one or more attachment bracket bottom walls 1330 may define an attachment bracket space 1350. In an embodiment, the one or more attachment bracket sidewalls 1320 may be comprised of a first attachment bracket sidewall and a second attachment bracket sidewall disposed at opposite ends of the attachment bracket top wall 1310. In such an embodiment a first side of the one or more attachment bracket sidewalls 1320 may be affixed to the attachment bracket top wall 1310, while a second end of the one or more attachment bracket sidewalls 1320 may be affixed to the one or more attachment bracket bottom walls 1330. In another embodiment, the one or more attachment bracket bottom walls 1330 may be orthogonal to the one or more attachment bracket sidewalls 1320. In such an embodiment, the one or more bottom walls 1330 may be disposed upon an inside surface of the one or more sidewalls 1320, such that the attachment bracket space 1350 is defined by a width of the top wall 1310, a width of the one or more bottom walls 1330, and a height of the one or more sidewalls 1320. In an embodiment, the attachment bracket space 1350 may be configured to receive the rigid member. In such an embodiment, the crossbar attachment bracket 960 may be configured to be reversibly coupled to the rigid member. For example, the crossbar attachment bracket 960 may reside upon the crossbar 910 via the attachment bracket space 1350. In such an example, the one or more attachment bracket flanges 1340 may fall below a bottom surface of the crossbar 910.

The one or more attachment bracket flanges 1340 may be parallel to the one or more attachment bracket sidewalls 1320. Moreover, the flanges 1340 may be orthogonal to the one or more attachment bracket bottom walls 1330. Such a configuration may enable said flanges 1340 to fall below a bottom surface of the rigid member when the crossbar attachment bracket 960 is residing upon said rigid member. In an embodiment, the one or more crossbar attachments 920 may be reversibly coupled to the one or more attachment bracket flanges 1340. In such an embodiment, the one or more attachment bracket flanges 1340 may be further comprised of one or more flange apertures (not depicted), wherein said apertures enable fluid communication between a first side of the one or more attachment bracket flanges 1340 and a second side of the one or more attachment bracket flanges 1340. As a nonlimiting example, the one or more flanges 1340, reversibly coupled to the crossbar 910, may facilitate reverse coupling of the one or more crossbar attachments 920 to the crossbar 910 via at least one of a clevis, an S-Hook, a spring clip, a QuickLink, and a carabiner. As a further nonlimiting example, a carabiner may facilitate reverse coupling between a strap of the one or more crossbar attachments 920 to the one or more attachment bracket flanges 1340. Such a nonlimiting example may be desirable because it allows the user to interchange crossbar attachments 920 quickly and easily.

Figure 14:
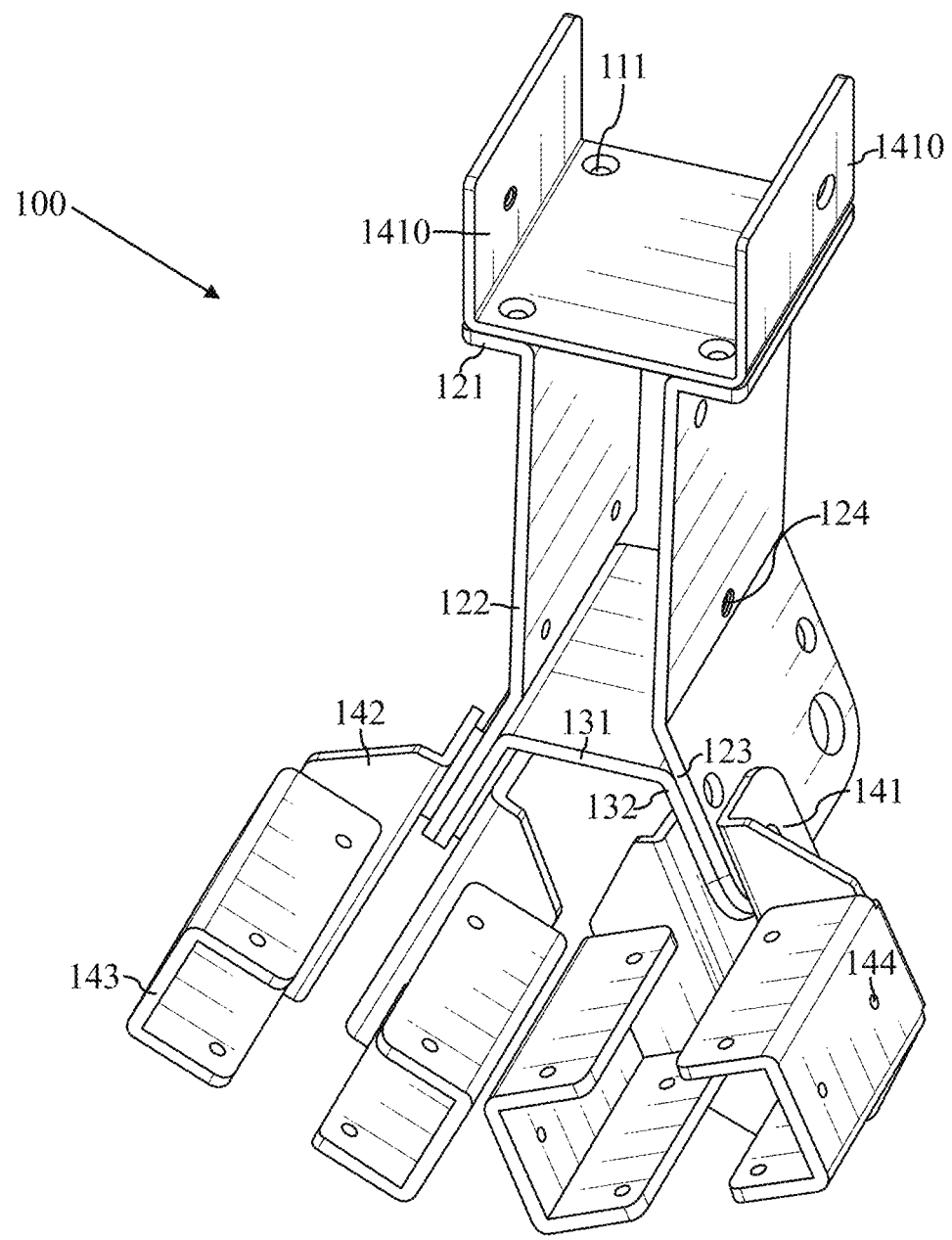
FIG. 14 is an illustration of a top front right perspective view of an embodiment of the junction assembly in an engaged state.

Referring to FIG. 14, the junction assembly 100 may be further comprised of one or more top member flanges 1410. In an embodiment, the one or more top member flanges 1410 may be disposed upon the top member 110. For example, the one or more top member flanges 1410 may be perpendicular to the top member 110. In another embodiment, the one or more top member flanges 1410 may be comprised of two flanges. In such an embodiment, a first flange may be disposed upon a first side of the top member 110 and a second flange may be disposed upon a second side of the top member 110, such that a width of the top member 110 is defined. In a further embodiment, the one or more top member flanges 1410, in concert with the top member 110, may be configured to accept the rigid member. As a non-limiting example, the rigid member may be comprised of the secondary crossbar. Such an embodiment may prevent the secondary crossbar from being over torqued due to use of the one or more crossbar attachments 920.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A junction assembly comprising:
    a primary hub, the primary hub comprising:
        one or more primary hub sidewalls,
        one or more primary hub angular members, and
        one or more primary hub top walls;
    a top member disposed atop the primary hub;
    a secondary hub disposed below the primary hub including:
        a secondary hub top wall, and
        one or more secondary hub angular members; and
    one or more brackets pivotably coupled to at least one of the primary hub and the secondary hub.

2. The junction assembly of claim 1, wherein the one or more primary hub angular members are interfacing the one or more secondary hub angular members.

3. The junction assembly of claim 2, further comprising:
    a junction assembly void defined by the top member, the one or more primary hub sidewalls, and the secondary hub top wall.

4. The junction assembly of claim 3, wherein the junction assembly void is configured to receive and securely house a rigid member.

5. The junction assembly of claim 1, wherein each of the one or more brackets are comprised of:
    one or more bracket stems;
    one or more bracket top walls;
    one or more bracket sidewalls; and
    one or more bracket apertures.

6. The junction assembly of claim 5, wherein the one or more bracket stems are pivotably coupled to the one or more primary hub angular members and the one or more secondary hub angular members.

7. The junction assembly of claim 6, wherein the one or more brackets are configured to transpose between an engaged state and an unengaged state.

8. The junction assembly of claim 7, wherein, in the engaged state, the one or more brackets protrude at an angle.

9. The junction assembly of claim 7, wherein, in the unengaged state, the one or more brackets protrude in parallel.

10. The junction assembly of claim 7, wherein the one or more brackets are configured to receive and securely house a rigid member in the engaged state.

11. The junction assembly of claim 1 further comprising a pair of top member flanges disposed perpendicularly from the top member, wherein the top member is configured to support a rigid member.

12. A junction assembly comprising:
    a primary hub, the primary hub comprising:
        one or more primary hub top walls,
        one or more primary hub sidewalls,
        one or more primary hub angular members, and
        one or more primary hub apertures,
            the one or more primary hub apertures disposed on at least one of the one or more primary hub top walls, the one or more primary hub sidewalls, and the one or more primary hub angular members;
    a top member disposed atop the one or more primary hub top walls;
    a secondary hub comprising:
        a secondary hub top wall, and
        one or more secondary hub angular members interfacing the one or more primary hub angular members;
    a junction assembly void defined by the top member, the one or more primary hub sidewalls, and the secondary hub top wall,
        the junction assembly void configured to receive and securely house at least one rigid member; and
    one or more brackets pivotably coupled to both the one or more primary hub angular members and the one or more secondary hub angular members,
        the one or more brackets configured to be transposed between an engaged state and an unengaged state,
        the one or more brackets configured to receive and securely house the at least one rigid member in the engaged state, and
        the one or more brackets protrude in parallel in the unengaged state.

13. The junction assembly of claim 12, wherein the at least one rigid member is comprised of at least one of an A-frame and a crossbar.

14. The junction assembly of claim 12, wherein the one or more brackets are comprised of:
    one or more bracket stems;
    one or more bracket top walls;
    one or more bracket sidewalls; and
    one or more bracket apertures.

15. The junction assembly of claim 14, wherein one or more fasteners are configured to traverse the one or more bracket apertures, such that the one or more fasteners enable the one or more brackets to securely house the at least one rigid member.

16. The junction assembly of claim 12, wherein, in the engaged state, the one or more brackets protrude at an angle.

17. The junction assembly of claim 12 further comprising a pair of top member flanges disposed perpendicularly from the top member, wherein the top member is configured to support the at least one rigid member.

\* \* \* \* \*